(12) United States Patent
Taylor (10) Patent No.: US 11,178,379 B2
(45) Date of Patent: Nov. 16, 2021

(54) DETERMINING A PREDICTED HEAD POSE TIME

(71) Applicant: Magic Leap, Inc., Plantation, FL (US)

(72) Inventor: Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/987,160

(22) Filed: Aug. 6, 2020

(65) Prior Publication Data

US 2021/0044792 A1    Feb. 11, 2021

Related U.S. Application Data

(60) Provisional application No. 62/883,847, filed on Aug. 7, 2019.

(51) Int. Cl.

| | | |
|---|---|---|
| *H04N 13/167* | (2018.01) | |
| *G02B 27/00* | (2006.01) | |
| *H04N 5/06* | (2006.01) | |
| *G02B 27/01* | (2006.01) | |

(52) U.S. Cl.
CPC ....... *H04N 13/167* (2018.05); *G02B 27/0093* (2013.01); *H04N 5/06* (2013.01); *G02B 2027/014* (2013.01); *G02B 2027/0138* (2013.01)

(58) Field of Classification Search
USPC ........................................................ 348/43
See application file for complete search history.

(56) References Cited

U.S. PATENT DOCUMENTS

| | | | | |
|---|---|---|---|---|
| 2016/0364904 | A1* | 12/2016 | Parker | G02B 27/0093 |
| 2019/0037244 | A1* | 1/2019 | Melkote Krishnaprasad | |
| | | | | H04N 19/167 |
| 2020/0043223 | A1* | 2/2020 | Leiby | G06T 15/205 |
| 2020/0348750 | A1* | 11/2020 | Selan | G09G 3/3208 |

* cited by examiner

*Primary Examiner* — Behrooz M Senfi
(74) *Attorney, Agent, or Firm* — Kilpatrick Townsend & Stockton LLP (57) ABSTRACT

Techniques for calculating a predicted head pose time for a display device are described herein. A request to start a frame is generated. A target finish time stamp associated with rendering the frame is calculated. A number of VSync periods from a last VSync to a target VSync is determined based on the target finish time stamp. A target VSync time stamp is calculated based on the number of VSync periods from the last VSync to the target VSync. The target VSync time stamp is compared to the target finish time stamp. The predicted head pose time is calculated based on the target VSync time stamp and a fixed platform offset.

20 Claims, 6 Drawing Sheets

DETERMINING A PREDICTED HEAD POSE TIME

CROSS-REFERENCES TO RELATED APPLICATIONS

This application claims the benefit of priority to U.S. Provisional Patent Application No. 62/883,847, filed Aug. 7, 2019, entitled "DETERMINING A PREDICTED HEAD POSE TIME," the entire content of which is incorporated herein by reference for all purposes.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

A summary of the invention is provided below in reference to a list of examples. As used below, any reference to a series of examples is to be understood as a reference to each of those examples disjunctively (e.g., "Examples 1-4" is to be understood as "Examples 1, 2, 3, or 4").

Example 1 is a method of operating a display device, the method comprising: generating a request to start a frame, wherein the frame is to be displayed by the display device; calculating a target finish time stamp associated with rendering the frame, wherein the target finish time stamp is calculated based on a first amount of time for one or more processors to generate the frame; determining a number of VSync periods from a last VSync to a target VSync based on the target finish time stamp to obtain a target VSync time stamp; and calculating a predicted head pose time based on the target VSync time stamp and a fixed platform offset, wherein the fixed platform offset relates to a second amount of time for transferring the frame to the display device for display.

Example 2 is the method of example(s) 1, further comprising: comparing the target VSync time stamp to the target finish time stamp; and based on the comparison, delaying the target VSync time stamp by 1 VSync period.

Example 3 is the method of example(s) 1, further comprising: providing the predicted head pose time to a head pose estimator.

Example 4 is the method of example(s) 1, further comprising: calculating a head pose based on the predicted head pose time.

Example 5 is the method of example(s) 1, further comprising: rendering the frame based on the predicted head pose time.

Example 6 is the method of example(s) 1, further comprising: displaying virtual content at the display device based on the predicted head pose time.

Example 7 is the method of example(s) 1, wherein the display device is an augmented reality (AR) device.

Example 8 is a system comprising: a processor; and a computer-readable medium comprising instructions that, when executed by the processor, cause the processor to perform operations comprising: generating a request to start a frame, wherein the frame is to be displayed by a display device; calculating a target finish time stamp associated with rendering the frame, wherein the target finish time stamp is calculated based on a first amount of time for one or more processors to generate the frame; determining a number of VSync periods from a last VSync to a target VSync based on the target finish time stamp to obtain a target VSync time stamp; and calculating a predicted head pose time based on the target VSync time stamp and a fixed platform offset, wherein the fixed platform offset relates to a second amount of time for transferring the frame to the display device for display.

Example 9 is the system of example(s) 8, wherein the operations further comprise: comparing the target VSync time stamp to the target finish time stamp; and based on the comparison, delaying the target VSync time stamp by 1 VSync period.

Example 10 is the system of example(s) 8, wherein the operations further comprise: providing the predicted head pose time to a head pose estimator.

Example 11 is the system of example(s) 8, wherein the operations further comprise: calculating a head pose based on the predicted head pose time.

Example 12 is the system of example(s) 8, wherein the operations further comprise: rendering the frame based on the predicted head pose time.

Example 13 is the system of example(s) 8, wherein the operations further comprise: displaying virtual content at the display device based on the predicted head pose time.

Example 14 is the system of example(s) 8, wherein the display device is an augmented reality (AR) device.

Example 15 is a non-transitory computer-readable medium comprising instructions that, when executed by a processor, cause the processor to perform operations comprising: generating a request to start a frame, wherein the frame is to be displayed by a display device; calculating a target finish time stamp associated with rendering the frame, wherein the target finish time stamp is calculated based on a first amount of time for one or more processors to generate the frame; determining a number of VSync periods from a last VSync to a target VSync based on the target finish time stamp to obtain a target VSync time stamp; and calculating a predicted head pose time based on the target VSync time stamp and a fixed platform offset, wherein the fixed platform offset relates to a second amount of time for transferring the frame to the display device for display.

Example 16 is the non-transitory computer-readable medium of example(s) 15, wherein the operations further comprise: comparing the target VSync time stamp to the target finish time stamp; and based on the comparison, delaying the target VSync time stamp by 1 VSync period.

Example 17 is the non-transitory computer-readable medium of example(s) 15, wherein the operations further comprise: providing the predicted head pose time to a head pose estimator.

Example 18 is the non-transitory computer-readable medium of example(s) 15, wherein the operations further comprise: calculating a head pose based on the predicted head pose time.

Example 19 is the non-transitory computer-readable medium of example(s) 15, wherein the operations further comprise: rendering the frame based on the predicted head pose time.

Example 20 is the non-transitory computer-readable medium of example(s) 15, wherein the operations further comprise: displaying virtual content at the display device based on the predicted head pose time.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF SPECIFIC EMBODIMENTS

One major challenge in virtual reality (VR) or augmented reality (AR) systems is generating virtual content based on user movement. For example, when a user moves their head, their area of vision (e.g., field of view) and the perspective of objects (e.g., real world objects and/or virtual objects, referred to as "overlay content") within the area of vision may change. To appear comfortable and natural to the user, the overlay content that is displayed to the user can be modified in real time (or close to real time) to account for the user movement, thereby providing a more realistic VR or AR experience.

A refresh rate of the system may govern a rate at which the system generates content and/or displays (or sends for display) the generated content to a user. In some instances, if the refresh rate of the system is 60 Hertz (Hz), the system generates (e.g., renders, modifies, and the like) content and/or displays the generated content approximately every 16 milliseconds (ms). In some embodiments, the rate at which the system generates the content, the rate at which the system displays the generated content, and the refresh rate of the system may be different. In some instances, the rate at which the system generates content and the rate at which the system displays the generated content may be functions of the refresh rate of the system.

In some instances, VR and AR systems may generate content based on a pose of the user. For example, the system may determine a pose of the user (such as the pose of the user's head, referred to as "head pose"), generate content based on the determined pose, and display the generated content to the user all within the 16 ms time window. The time between when the system determines the pose of the user and when the system displays the generated content to the user is known as "motion-to-photon latency". The user may change their pose in the time between a first time at which the system determines the pose of the user that is used to generate the content and a second time at which the system displays the generated content. If this change in pose is not accounted for, it may result in an undesirable user experience. For example, the system may determine a first pose of the user and begin to generate content based on the first pose. The user may then change their pose to a second pose in the time between when the system determines the first pose and when the system displays the generated content to the user. Since the content is generated based on the first pose and the user now has the second pose, the generated content displayed to the user will appear misplaced with respect to the user because of pose mismatch, which may lead to an undesirable user experience.

In some instances, a correction may be applied to account for the change in the user's pose over an entire rendered image frame, for example, as a post-processing step operating on a buffered image. While this technique may work for panel displays that display an image frame by flashing/illuminating all pixels (e.g., in 2 ms) when all pixels are rendered, this technique may be less effective with scanning displays that display image frames on a pixel-by-pixel (or pixels-by-pixels) basis (e.g., in 16 ms) in a sequential manner. In scanning displays that display image frames on a pixel-by-pixel (or pixels-by-pixels) basis in a sequential manner, a time between a first pixel and a last pixel can be up to a full frame duration (e.g., 16 ms for a 60 Hz display) during which the user's pose may change significantly.

In many instances, it may not be possible to generate and display content to a user all within the 16 ms time window. For example, the time for a central processing unit (CPU) and a graphics processing unit (GPU) to render the frame alone may exceed 16 ms. In such instances, additional operations may need to be performed to ensure that the time delays between requesting a frame, rendering the frame, and transferring the frame to the display device are accounted for by the system and are incorporated into the frame rendering and head pose calculations.

Embodiments described herein provide for systems, methods, and other techniques for calculating a predicted head pose time, or simply predicting a head pose time, which is the time that rendered content is to be displayed to a user. Once calculated, the predicted head pose time may be used in the calculation of the head pose itself, and may further allow the AR system to adequately prepare and align various processes that prepare, handle, and deliver the rendered content.

Figure 1:
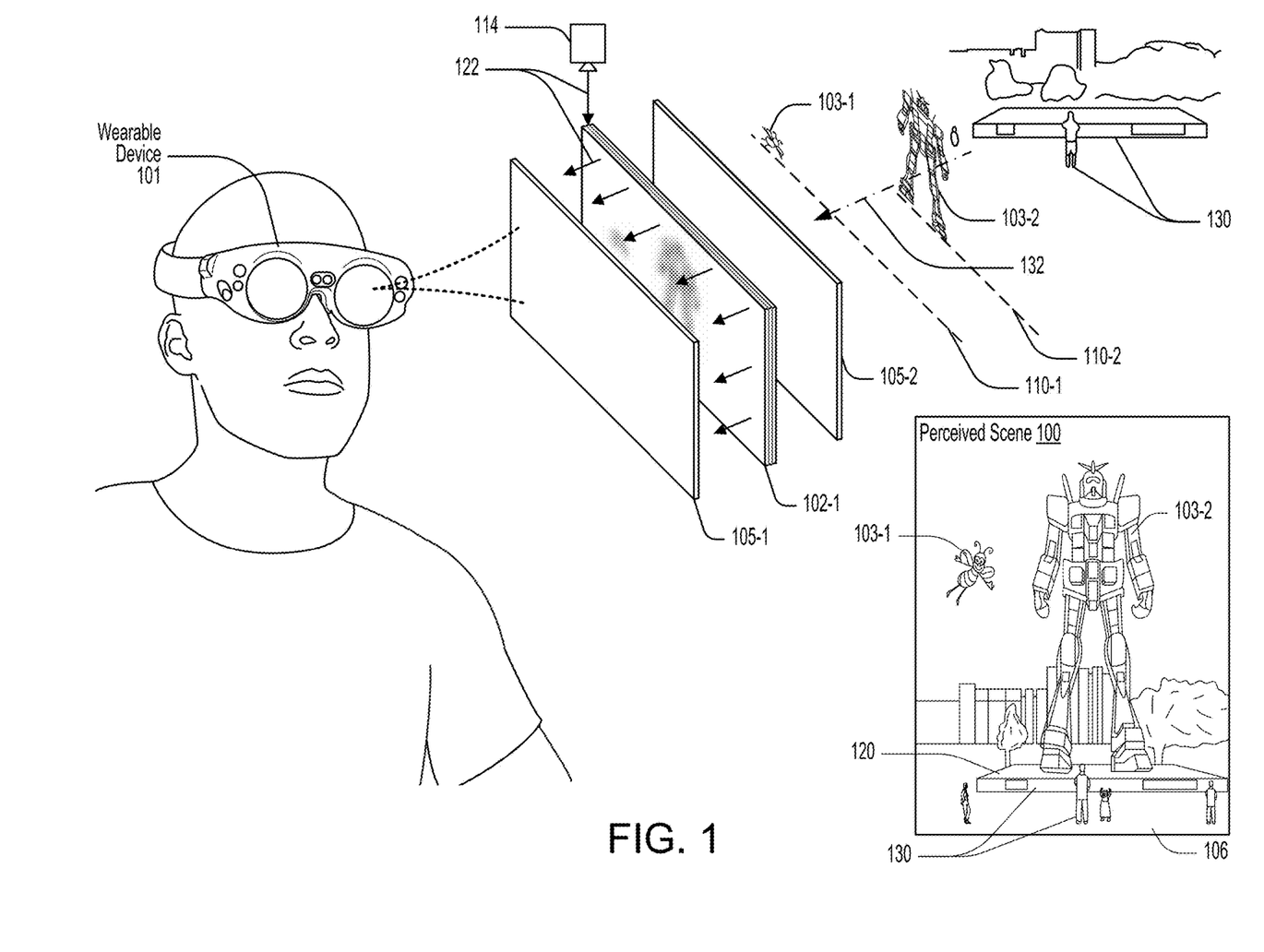
FIG. 1 illustrates a wearable device and a corresponding perceived scene.

FIG. 1 illustrates a wearable device 101 and a corresponding scene 100 as viewed through wearable device 101, according to some embodiments of the present disclosure. Scene 100 is depicted wherein a user of an AR technology sees a real-world park-like setting 106 featuring various real-world objects 130 such as people, trees, buildings in the background, and a real-world concrete platform 120. In addition to these items, the user of the AR technology also perceives that they "see" various virtual objects 103 such as a robot statue 103-2 standing upon the real-world concrete platform 120, and a cartoon-like avatar character 103-1 flying by, which seems to be a personification of a bumble bee, even though these elements (character 103-1 and statue 103-2) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

During operation, a projector 114 of wearable device 101 may project virtual image light 122 (i.e., light associated with virtual content) onto an eyepiece 202-1, which may cause a light field (i.e., an angular representation of virtual content) to be projected onto a retina of a user in a manner such that the user perceives the corresponding virtual content as being positioned at some location within an environment of the user. For example, virtual image light 122 outcoupled by eyepiece 102-1 may cause the user to perceive character 103-1 as being positioned at a first virtual depth plane 110-1 and statue 103-2 as being positioned at a second virtual depth plane 110-2. The user perceives the virtual content along with world light 132 corresponding to one or more world objects 130, such as platform 120.

In some embodiments, wearable device 101 includes a first lens assembly 105-1 positioned on the user side of eyepiece 102-1 (the side of eyepiece 102-1 closest to the eye of the user) and a second lens assembly 105-2 positioned on the world side of eyepiece 102-1. Each of lens assemblies 105-1, 105-2 may be configured to apply optical power to the light passing therethrough.

Figure 2:
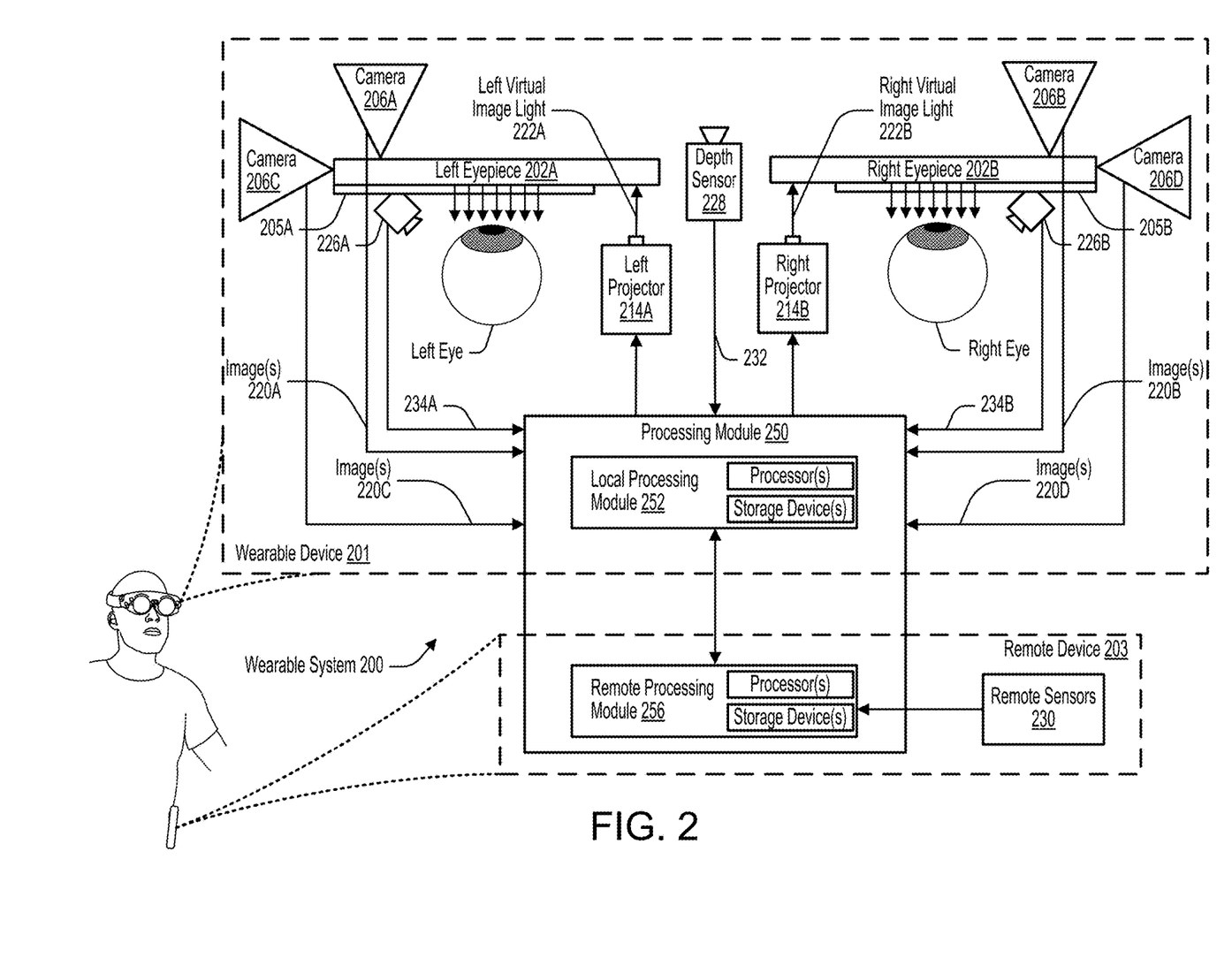
FIG. 2 illustrates a schematic view of an example wearable system.

FIG. 2 illustrates a schematic view of an example wearable system 200, according to some embodiments of the present disclosure. Wearable system 200 may include a wearable device 201 and at least one remote device 203 that is remote from wearable device 201 (e.g., separate hardware but communicatively coupled). Wearable system 200 may alternatively be referred to as a display system and wearable device 201 may alternatively be referred to as a display device. Wearable device 201 as described in reference to FIG. 2 may correspond to wearable device 101 as described above in reference to FIG. 1. While wearable device 201 is worn by a user (generally as a headset), remote device 203 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 201 may include a left eyepiece 202A and a left lens assembly 205A arranged in a side-by-side configuration and constituting a left optical stack. Left lens assembly 205A may include an accommodating lens on the user side of the left optical stack as well as a compensating lens on the world side of the left optical stack. Similarly, wearable device 201 may include a right eyepiece 202B and a right lens assembly 205B arranged in a side-by-side configuration and constituting a right optical stack. Right lens assembly 205B may include an accommodating lens on the user side of the right optical stack as well as a compensating lens on the world side of the right optical stack.

In some embodiments, wearable device 201 includes one or more sensors including, but not limited to: a left front-facing world camera 206A attached directly to or near left eyepiece 202A, a right front-facing world camera 206B attached directly to or near right eyepiece 202B, a left side-facing world camera 206C attached directly to or near left eyepiece 202A, a right side-facing world camera 206D attached directly to or near right eyepiece 202B, a left eye tracking camera 226A directed toward the left eye, a right eye tracking camera 226B directed toward the right eye, and a depth sensor 228 attached between eyepieces 202. Wearable device 201 may include one or more image projection devices such as a left projector 214A optically linked to left eyepiece 202A and a right projector 214B optically linked to right eyepiece 202B.

Wearable system 200 may include a processing module 250 for collecting, processing, and/or controlling data within the system. Components of processing module 250 may be distributed between wearable device 201 and remote device 203. For example, processing module 250 may include a local processing module 252 on the wearable portion of wearable system 200 and a remote processing module 256 physically separate from and communicatively linked to local processing module 252. Each of local processing module 252 and remote processing module 256 may include one or more processing units (e.g., central processing units (CPUs), graphics processing units (GPUs), etc.) and one or more storage devices, such as non-volatile memory (e.g., flash memory).

Processing module 250 may collect the data captured by various sensors of wearable system 200, such as cameras 206, eye tracking cameras 226, depth sensor 228, remote sensors 230, ambient light sensors, microphones, inertial measurement units (IMUs), accelerometers, compasses, Global Navigation Satellite System (GNSS) units, radio devices, and/or gyroscopes. For example, processing module 250 may receive image(s) 220 from cameras 206. Specifically, processing module 250 may receive left front image(s) 220A from left front-facing world camera 206A, right front image(s) 220B from right front-facing world camera 206B, left side image(s) 220C from left side-facing world camera 206C, and right side image(s) 220D from right side-facing world camera 206D. In some embodiments, image(s) 220 may include a single image, a pair of images, a video comprising a stream of images, a video comprising a stream of paired images, and the like. Image(s) 220 may be periodically generated and sent to processing module 250 while wearable system 200 is powered on, or may be generated in response to an instruction sent by processing module 250 to one or more of the cameras.

Cameras 206 may be configured in various positions and orientations along the outer surface of wearable device 201 so as to capture images of the user's surrounding. In some instances, cameras 206A, 206B may be positioned to capture images that substantially overlap with the FOVs of a user's left and right eyes, respectively. Accordingly, placement of cameras 206 may be near a user's eyes but not so near as to obscure the user's FOV. Alternatively or additionally, cameras 206A, 206B may be positioned so as to align with the incoupling locations of virtual image light 222A, 222B, respectively. Cameras 206C, 206D may be positioned to capture images to the side of a user, e.g., in a user's peripheral vision or outside the user's peripheral vision. Image(s) 220C, 220D captured using cameras 206C, 206D need not necessarily overlap with image(s) 220A, 220B captured using cameras 206A, 206B.

In some embodiments, processing module 250 may receive ambient light information from an ambient light sensor. The ambient light information may indicate a brightness value or a range of spatially-resolved brightness values. Depth sensor 228 may capture a depth image 232 in a front-facing direction of wearable device 201. Each value of depth image 232 may correspond to a distance between depth sensor 228 and the nearest detected object in a particular direction. As another example, processing module 250 may receive eye tracking data 234 from eye tracking cameras 226, which may include images of the left and right eyes. As another example, processing module 250 may receive projected image brightness values from one or both of projectors 214. Remote sensors 230 located within remote device 203 may include any of the above-described sensors with similar functionality.

Virtual content is delivered to the user of wearable system 200 using projectors 214 and eyepieces 202, along with other components in the optical stacks. For instance, eyepieces 202A, 202B may comprise transparent or semi-transparent waveguides configured to direct and outcouple light generated by projectors 214A, 214B, respectively. Specifically, processing module 250 may cause left projector 214A to output left virtual image light 222A onto left eyepiece 202A, and may cause right projector 214B to output right virtual image light 222B onto right eyepiece 202B. In some embodiments, projectors 214 may include micro-electromechanical system (MEMS) spatial light modulator (SLM) scanning devices. In some embodiments, each of eyepieces 202A, 202B may comprise a plurality of waveguides corresponding to different colors. In some embodiments, lens assemblies 205A, 205B may be coupled to and/or integrated with eyepieces 202A, 202B. For example, lens assemblies 205A, 205B may be incorporated into a multi-layer eyepiece and may form one or more layers that make up one of eyepieces 202A, 202B.

Figure 3:
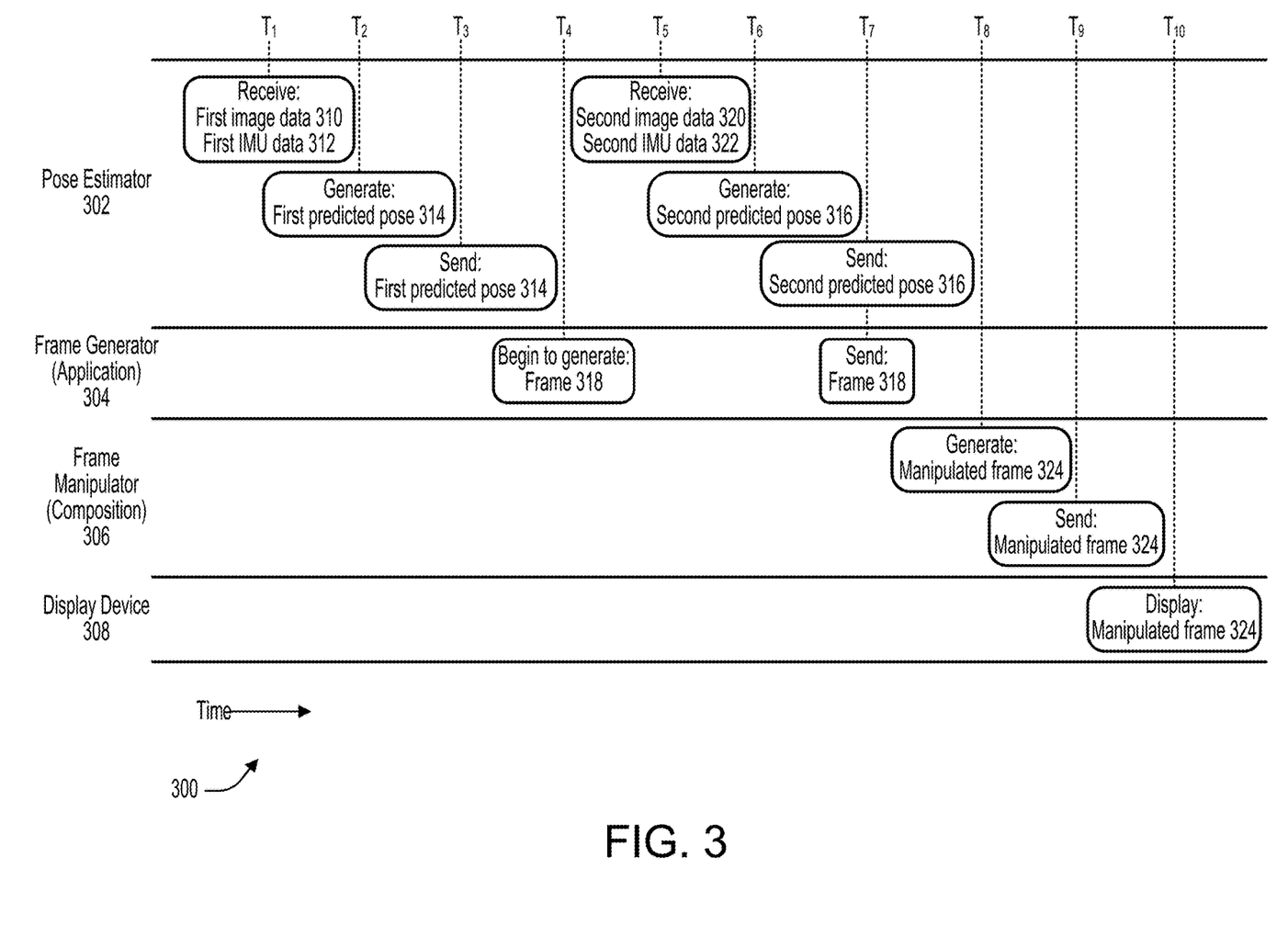
FIG. 3 illustrates a timing chart showing a process for calculating a predicted head pose time for displaying virtual content to a user.

FIG. 3 illustrates a timing chart 300 showing a process for calculating a predicted head pose time for displaying virtual content to a user, according to some embodiments of the present disclosure. A device or system that may implement timing chart 300 may include a pose estimator 302 that receives first image data 310 from one or more cameras and/or first IMU data 312 from one or more IMUs. First image data 310 may include one or more captured images from which a pose may be determined, such as images captured by a front-facing camera mounted to a wearable device. First IMU data 312 may include various data indicative of movement of the wearable device, such as accelerometer or gyroscope readings. First IMU data 312 may be captured by one or more IMUs mounted to the wearable device.

In the illustrated example, pose estimator 302 receives first image data 310 and first IMU data 312 at time $T_1$. At time $T_2$, pose estimator 302 may generate a first predicted pose 314 based on received first image data 310 and/or first IMU data 312, and provide first predicted pose 314 to a frame generator 304 at time $T_3$. First predicted pose 314 may correspond to a prediction of the user's head pose at a later time when the virtual content is to be displayed to the user (time $T_{10}$). In some embodiments, first predicted pose 314 may include a single prediction corresponding to a single channel (e.g., the green channel). In some embodiments, first predicted pose 314 may include multiple predictions corresponding to the different channels. The time to which the predicted head pose corresponds may be referred to herein as the "predicted head pose time".

Frame generator 304 may generate 3D content (e.g., 3D image data) using a CPU and provide the 3D content to a GPU for rendering. The CPU may begin generating 3D content at time $T_4$. The GPU may render a frame 318 based on the 3D content and provide frame 318 to a frame manipulator 306 at time $T_7$. Because the operations performed by frame generator 304 can be extensive, a relatively significant amount of time may pass between frame generator 304 beginning to generate frame 318 (time $T_4$) and frame generator 304 providing frame 318 to frame manipulator 306 (time $T_6$). Accordingly, during that time period, a user may move their head in such a way that first predicted pose 314 may become a less accurate prediction of the user's actual pose at time $T_{10}$ when the virtual content is displayed to the user.

As such, at time $T_5$, pose estimator 302 may receive second image data 320 and/or second IMU data 322, which may be more recently collected data by the cameras and IMUs, respectively. At time $T_6$, pose estimator 302 may generate a second predicted pose 316 based on received second image data 320 and/or second IMU data 322, and provide second predicted pose 316 to frame manipulator 306 at time $T_7$. Similar to first predicted pose 314, second predicted pose 316 may correspond to a prediction of the user's pose when the virtual content will be displayed to the user (time $T_{10}$). Frame manipulator 306 may modify frame 318 while incorporating the change in pose (delta pose) between first predicted pose 314 and second predicted pose 316 as well as any change to the eye camera model or projection model between render and illumination. Frame manipulator 306 can further modify frame 318 based on motion, depth, and other meta-deta to support improved manipulation.

In some examples, frame manipulator 306 may split frame 318 into different color channels and manipulate (e.g., warp) each in accordance with the sequential order that the channels are to be displayed (e.g., red, green, then blue). In some embodiments, second predicted pose 316 may include a single prediction corresponding to a single channel (e.g., the green channel). In some embodiments, second predicted pose 316 may include multiple predictions corresponding to the different channels (e.g., one predicted pose for the red channel, one predicted pose for the green channel, and one predicted pose for the blue channel). Frame manipulator 306 may additionally perform various corrections to the frame, such as geometric corrections. Frame manipulator 306 may generate a manipulated frame 324 at time $T_8$ and provide manipulated frame 324 to a display device 308 at time $T_9$. Display device 308 then causes photons to be generated and emitted toward the eyes of the user, thereby displaying an image (e.g., manipulated frame 324) on display device 308 at time $T_{10}$.

Figure 4:
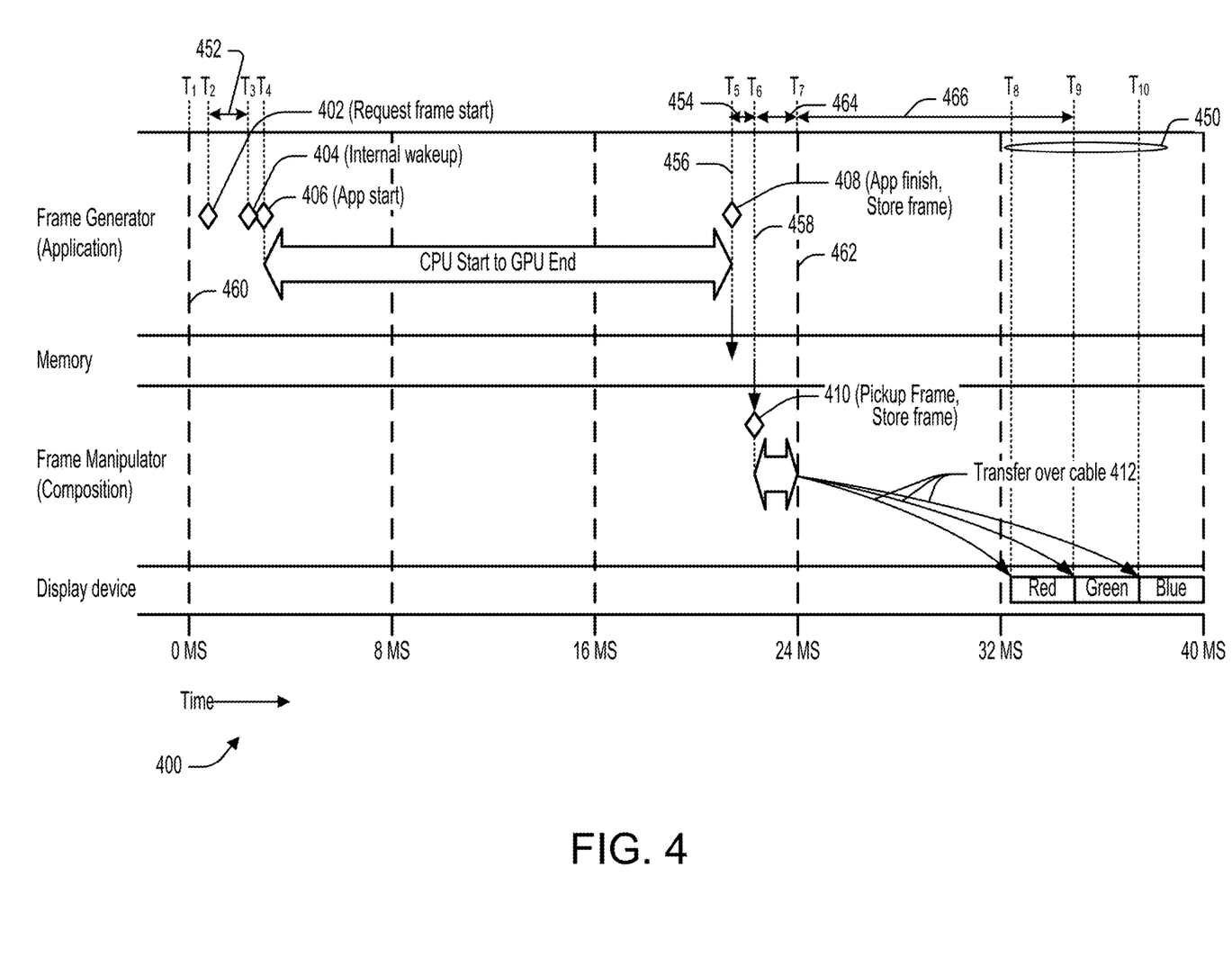
FIG. 4 illustrates a timing chart showing a process for calculating a predicted head pose time for displaying virtual content to a user.

FIG. 4 illustrates a timing chart 400 showing a process for calculating a predicted head pose time for displaying virtual content to a user, according to some embodiments of the present disclosure. Specifically, operations are illustrated with respect to a frame generator (which may be implemented by an application process being executed by the CPU and/or GPU), a memory device, a frame manipulator (which may be implemented by a composition process being executed by the CPU, the GPU, and/or an ASIC specifically designed to apply a planar reprojection, a convolution filter, etc.), and/or a display device. In some embodiments, vertical dashed lines correspond to vertical sync (VSync) periods which, in the illustrated embodiment, occur every 8 ms (120

Hz). In various embodiments, VSync periods may occur at rates of 40 Hz, 60 Hz, 80 Hz, 100 Hz, 120 Hz, 240 Hz, 480 Hz, 1,000 Hz, 2,000 Hz, and the like.

At 402, a request to start a frame is generated. In some embodiments, the request to start a frame may be generated by a frame generator (e.g., a frame generator of an application). In response to the request, a (first) predicted head pose time may be calculated corresponding to the time at which the frame will be displayed by the display device. In some embodiments, a frame manipulator (e.g., a frame manipulator of a compositor or other component of a system) may calculate the predicted head pose time. The predicted head pose time may be calculated based on the time the request to start the frame is generated (time $T_2$). In some embodiments, one or more illumination time stamps 450 may be determined, and the predicted head pose time may be set equal to or calculated based on the determined illumination time stamps. The illumination time stamps may correspond to the times that the frame will be displayed by the display device (e.g., times $T_8$, $T_9$, $T_{10}$) for different color channels. In some embodiments, a single illumination time stamp is determined corresponding to a midpoint of a period of illumination. For example, the single illumination time stamp may be a midpoint of a period of illumination of the green channel. Accordingly, the predicted head pose time may be set equal to $T_8$, $T_9$, $T_{10}$, or may be calculated as a function of one or more thereof. Techniques for arriving at illumination time stamps 450 and, additionally, a predicted head pose time are described herein.

At 404, an internal wakeup is initiated at time $T_3$ after a period of time referred to as a hold period 452 has passed since time $T_2$. In some embodiments, when the internal wakeup is initiated, a predicted head pose at the predicted head pose time may be calculated as described herein. In some embodiments, the predicted head pose is provided to the frame generator.

At 406, the application starts and the frame generator generates a frame based on the predicted head pose. In some embodiments, the frame generator is implemented using a CPU and a GPU, where the CPU generates 3D content based on the predicted head pose and provides the 3D content to the GPU for rendering. Depending on the complexity of the frame, the time between the CPU starting processing and the GPU ending processing may last multiple VSync periods (from time $T_4$ to $T_5$). In some embodiments, the frame generator may be implemented using only a GPU.

At 408, the application finishes at time $T_5$ and the frame generated by the frame generator is stored in a memory device until it is retrieved by the frame manipulator.

At 410, the frame is picked up (e.g., retrieved, accessed, or the like) at time $T_6$ by the frame manipulator, which begins processing of the frame (e.g., preparing the frame for display). Additionally, a new (second) predicted head pose at the predicted head pose time may be calculated based on sensor data (e.g., image data and/or IMU data) that has changed since the first predicted head pose was calculated. In some embodiments, the frame manipulator adjusts the frame using the new predicted head pose and performs other corrections to the frame. The amount of time that the frame is processed by the frame manipulator is referred to as a composition time 464 (between times $T_6$ and $T_7$).

At 412, the frame is transferred to a display device for display to the user. In the illustrated embodiment, display of the red channel of the frame begins at time $T_8$, display of the green channel begins at time $T_9$, and display of the blue channel begins at $T_{10}$.

In some embodiments, multiple calculations are performed to calculate the predicted head pose time when the request to start the frame is generated at time $T_2$. For example, a hold period 452 between the request for the frame start 402 and the internal wakeup 404 may first be calculated. Next, a platform budget 454 that accounts for the time to hand off the frame between the frame generator and the frame manipulator may be calculated. Next, a target finish time stamp 456 corresponding to when the frame generator needs to be finished rendering the frame may be calculated based on hold period 452 and the VSync period using Equation (EQ.) 1 as follows:

$$\text{Target Finish Time Stamp} = \text{Internal Wakeup} + 3 * \text{VSync Period} - \text{Platform Budget} \quad (1)$$

where "Internal Wakeup" is the time stamp of the internal wakeup (time $T_3$). In the illustrated embodiment, the VSync period is 8 ms and the platform budget is $T_6$-$T_5$. The multiplication between the VSync period and 3 in EQ. 1 is specific for a 60 Hz cadence when the native VSync period is 120 Hz. In some embodiments, a platform VSync period of N Hz may be used and corresponding alignment periods would be available that include N/2 Hz, N/4 Hz, N/8 Hz, N/16 Hz, and the like.

Once the target finish time stamp is calculated, the number of VSync periods from a last VSync 460 (e.g., at time $T_1$) to a target VSync 462 (e.g., at time $T_7$) is calculated based on the last VSync using EQ. 2 as follows:

$$\text{Number of VSync Periods from Last VSync to Target VSync} = \text{Ceiling}[(\text{Target Finish Time Stamp} - \text{Last VSync})/\text{Frame Interval}] \quad (2)$$

In the illustrated example, the difference between the target finish time stamp and the last VSync yields approximately 21 ms, the frame interval is 8 ms, and the ratio between the two values is 2.6. Next, the ceiling of 2.6 is calculated to be equal to 3. Therefore, the number of VSyncs from the last VSync to the target VSync is 3. The time stamp of the target VSync can be calculated using EQ. 3 as follows:

$$\text{Target VSync Time Stamp} = \text{Last VSync} + \text{Number of VSyncs from Last VSync to Target VSync} * \text{VSync Period} \quad (3)$$

In the illustrated example, the last VSync occurred at 0 ms (time $T_1$), the VSync period is 8 ms, and therefore the target VSync time stamp is 24 ms (8 ms*3).

Next, it is determined whether the frame generation will finish in time such that the composition period that is associated with the target VSync time stamp can pick up the frame in time. This is accomplished by evaluating EQ. 4 as follows:

$$\text{Target VSync Time Stamp} - \text{Computational Offset from VSync} \geq \text{Target Finish Time Stamp} \quad (4)$$

where, in some embodiments, the computation offset from VSync is the combination of platform budget 454 and composition time 464. If EQ. 4 is satisfied, then the composition period and the target VSync time stamp continue to be used with their current values. Otherwise, the composition period and the target VSync time stamp are delayed by 1 VSync period. In the illustrated example, the target VSync time stamp (24 ms) minus the computational offset from VSync ($T_7$-$T_5$) is equal to the target finish time stamp ($T_5$). Accordingly, the composition period and the target VSync time stamp are not delayed by 1 VSync period.

The predicted head pose time is finally calculated as a function of the target VSync time stamp and a fixed platform offset 466 using EQ. 5 as follows:

$$\text{Predicted Head Pose Time} = \text{Target VSync Time Stamp} + \text{Fixed Platform Offset} \quad (5)$$

The fixed platform offset accounts for the time it takes for the frame to transfer to and be displayed on the display device. The fixed platform offset may be color specific. For example, the fixed platform offset may include a red fixed platform offset (e.g., $T_8$-$T_7$), a green fixed platform offset (e.g., $T_9$-$T_7$), a blue fixed platform offset (e.g., $T_{10}$-$T_7$), or some calculation based on these offsets. In some embodiments, the offsets may be measured from a midpoint of a color channel. In some embodiments, the transfer distance between the frame manipulator and the display device may be such that the frames may be displayed during the subsequent VSync time period immediately after the target VSync time stamp (e.g., between 24 ms and 32 ms).

Figure 5:
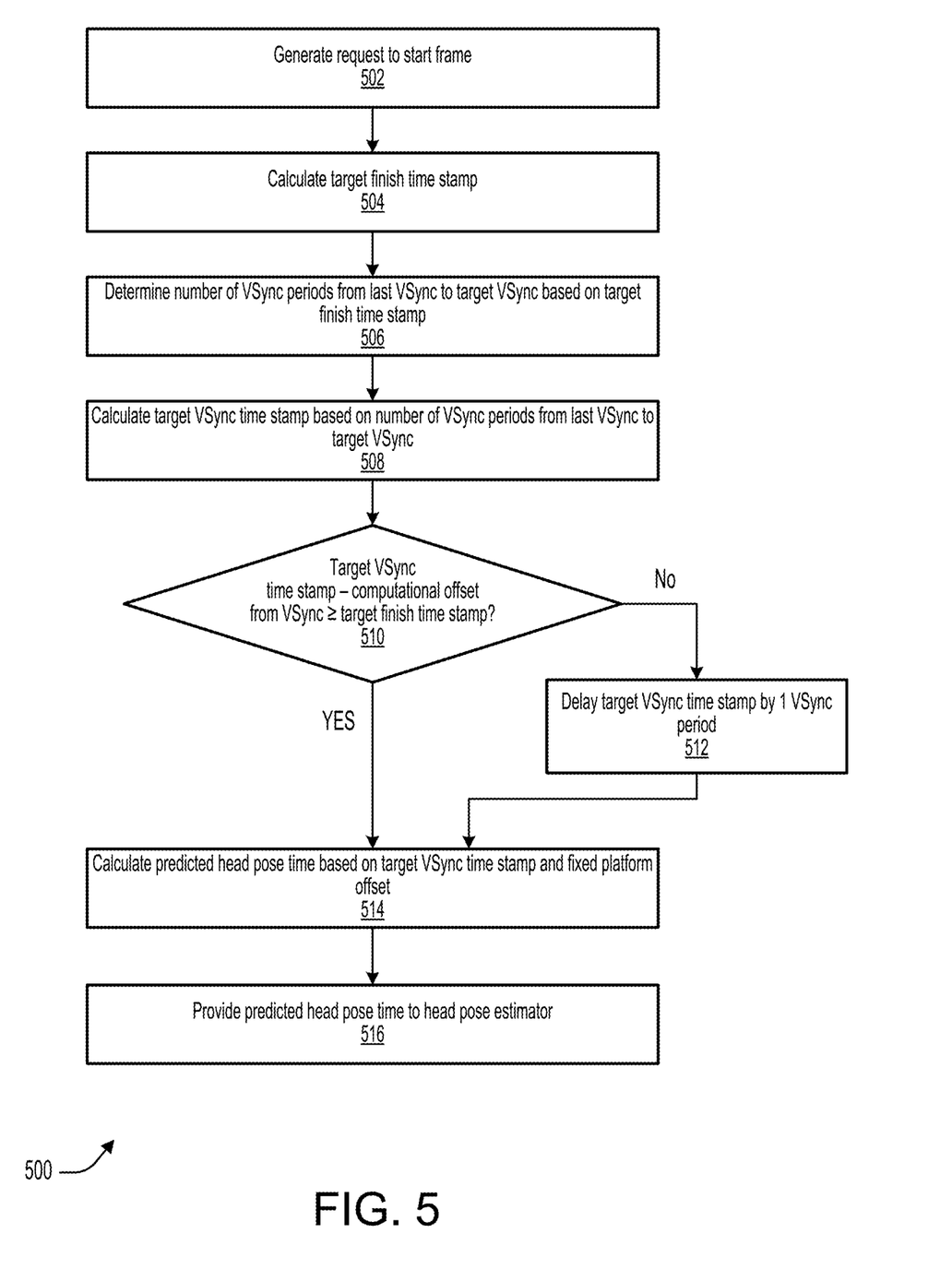
FIG. 5 illustrates a method of calculating a predicted head pose time.

FIG. 5 illustrates a method 500 of calculating a predicted head pose time, according to some embodiments of the present disclosure. One or more steps of method 500 may be performed in an order different than the illustrated embodiment, and one or more steps of method 500 may be omitted during performance of method 500. One or more steps of method 500 may be performed by one or more of the various components described herein, such as a frame generator, an application process, a memory device, a frame manipulator, a composition process, a display device, and the like.

At step 502, a request to start a frame is generated.

At step 504, a target finish time stamp is calculated based on an internal wakeup time, a VSync period, and a platform budget. In some embodiments, each of the internal wakeup time, VSync period, and platform budget may be first received and/or determined prior to calculating the target finish time.

At step 506, a number of VSync periods from a last VSync to a target VSync is determined based on the target finish time stamp, the last VSync, and a frame interval. In some instances, the frame interval may be different than the VSync period. For example, in the case where the application frame rate has been reduced by a $2^N$ factor (e.g., 15 Hz or 30 Hz on a native 60 Hz output).

At step 508, a target VSync time stamp is calculated based on the last VSync, the number of VSync periods from the last VSync to the target VSync, and the VSync period.

At step 510, it is determined whether a difference between the target VSync time stamp and a computational offset from VSync is greater than or equal to the target finish time stamp. If it is, then the target finish time stamp is not modified. If it is not greater than or equal to the target finish time stamp, then the target VSync time stamp is delayed by 1 VSync period at step 512.

At step 514, a predicted head pose time is calculated based on the target VSync time stamp and a fixed platform offset.

At step 516, the predicted head pose time is provided to a head pose estimator. The head pose estimator may calculate a predicted head pose based on the predicted head pose time.

In some embodiments, a frame may be generated or manipulated based on the predicted head pose.

Figure 6:
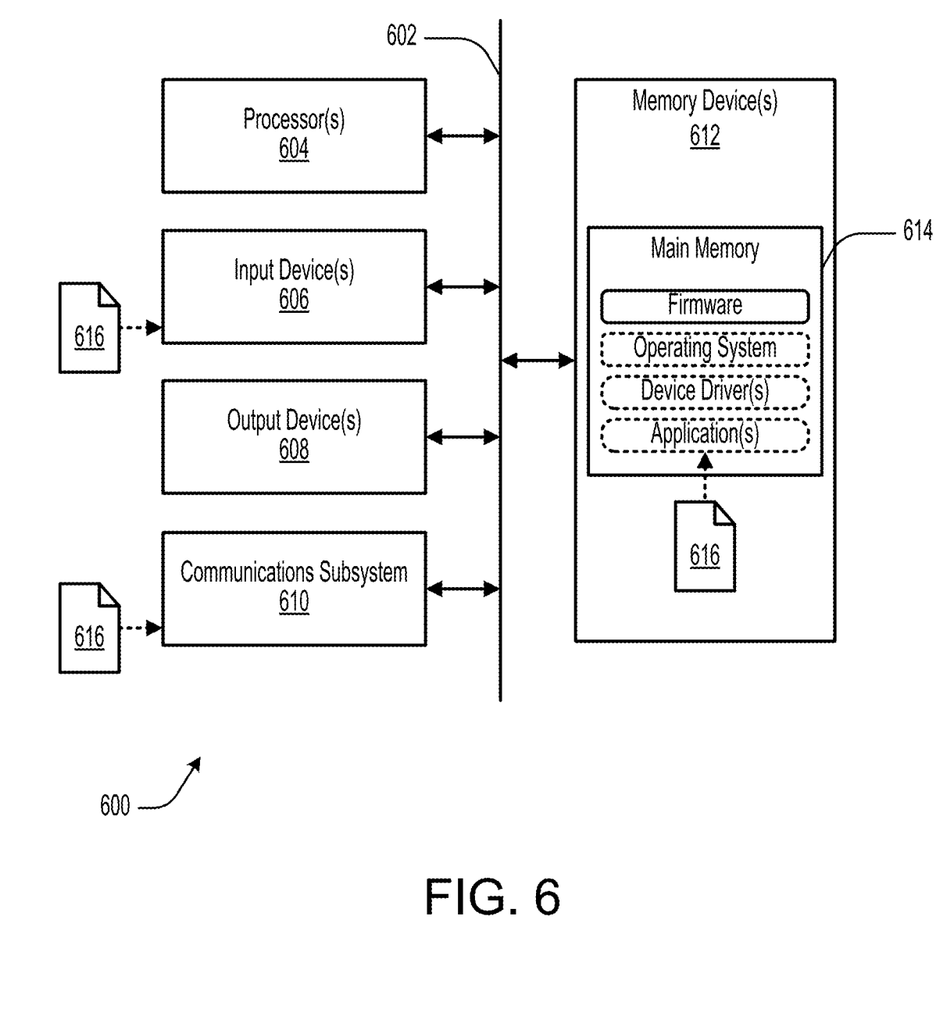
FIG. 6 illustrates an example computer system.

FIG. 6 illustrates an example computer system 600 comprising various hardware elements, according to some embodiments of the present disclosure. Computer system 600 may be incorporated into or integrated with devices described herein and/or may be configured to perform some or all of the steps of the methods provided by various embodiments. For example, in various embodiments, computer system 600 may be incorporated into wearable system 200 and/or may be configured to perform method 500. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

In the illustrated example, computer system 600 includes a communication medium 602, one or more processor(s) 604, one or more input device(s) 606, one or more output device(s) 608, a communications subsystem 610, and one or more memory device(s) 612. Computer system 600 may be implemented using various hardware implementations and embedded system technologies. For example, one or more elements of computer system 600 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device such as an SoC FPGA, among other possibilities.

The various hardware elements of computer system 600 may be coupled via communication medium 602. While communication medium 602 is illustrated as a single connection for purposes of clarity, it should be understood that communication medium 602 may include various numbers and types of communication media for transferring data between hardware elements. For example, communication medium 602 may include one or more wires (e.g., conductive traces, paths, or leads on a printed circuit board (PCB) or integrated circuit (IC), microstrips, striplines, coaxial cables, etc.), one or more optical waveguides (e.g., optical fibers, strip waveguides, etc.), one or more wireless connections or links (e.g., infrared wireless communication, radio communication, microwave wireless communication, etc.), among other possibilities.

In some embodiments, communication medium 602 may include one or more buses connecting pins of the hardware elements of computer system 600. For example, communication medium 602 may include a bus connecting processor(s) 604 with main memory 614, referred to as a system bus, and a bus connecting main memory 614 with input device(s) 606 or output device(s) 608, referred to as an expansion bus. The system bus may consist of several elements, including an address bus, a data bus, and a control bus. The address bus may carry a memory address from processor(s) 604 to the address bus circuitry associated with main memory 614 in order for the data bus to access and carry the data contained at the memory address back to processor(s) 604. The control bus may carry commands from processor(s) 604 and return status signals from main memory 614. Each bus may include multiple wires for carrying multiple bits of information and each bus may support serial or parallel transmission of data.

Processor(s) 604 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 604 may include one or more multi-core processors, in which each core may read and execute program instructions simultaneously with the other cores.

Input device(s) 606 may include one or more of various user input devices such as a mouse, a keyboard, a microphone, etc., as well as various sensor input devices, such as an image capture device, a pressure sensor (e.g., barometer, tactile sensor, etc.), a temperature sensor (e.g., thermometer, thermocouple, thermistor, etc.), a movement sensor (e.g., accelerometer, gyroscope, tilt sensor, etc.), a light sensor (e.g., photodiode, photodetector, charge-coupled device, etc.), and/or the like. Input device(s) 606 may also include devices for reading and/or receiving removable storage devices or other removable media. Such removable media may include optical discs (e.g., Blu-ray discs, DVDs, CDs, etc.), memory cards (e.g., CompactFlash card, Secure Digital (SD) card, Memory Stick, etc.), floppy disks, Universal Serial Bus (USB) flash drives, external hard disk drives (HDDs) or solid-state drives (SSDs), and/or the like.

Output device(s) 608 may include one or more of various devices that convert information into human-readable form, such as without limitation a display device, a speaker, a printer, and/or the like. Output device(s) 608 may also include devices for writing to removable storage devices or other removable media, such as those described in reference to input device(s) 606. Output device(s) 608 may also include various actuators for causing physical movement of one or more components. Such actuators may be hydraulic, pneumatic, electric, etc., and may be provided with control signals by computer system 600.

Communications subsystem 610 may include hardware components for connecting computer system 600 to systems or devices that are located external computer system 600, such as over a computer network. In various embodiments, communications subsystem 610 may include a wired communication device coupled to one or more input/output ports (e.g., a universal asynchronous receiver-transmitter (UART), etc.), an optical communication device (e.g., an optical modem, etc.), an infrared communication device, a radio communication device (e.g., a wireless network interface controller, a BLUETOOTH® device, an IEEE 802.11 device, a Wi-Fi device, a Wi-Max device, a cellular device, etc.), among other possibilities.

Memory device(s) 612 may include the various data storage devices of computer system 600. For example, memory device(s) 612 may include various types of computer memory with various response times and capacities, from faster response times and lower capacity memory, such as processor registers and caches (e.g., L0, L1, L2, etc.), to medium response time and medium capacity memory, such as random access memory, to lower response times and lower capacity memory, such as solid state drives and hard drive disks. While processor(s) 604 and memory device(s) 612 are illustrated as being separate elements, it should be understood that processor(s) 604 may include varying levels of on-processor memory such as processor registers and caches that may be utilized by a single processor or shared between multiple processors.

Memory device(s) 612 may include main memory 614, which may be directly accessible by processor(s) 604 via the memory bus of communication medium 602. For example, processor(s) 604 may continuously read and execute instructions stored in main memory 614. As such, various software elements may be loaded into main memory 614 to be read and executed by processor(s) 604 as illustrated in FIG. 6. Typically, main memory 614 is volatile memory, which loses all data when power is turned off and accordingly needs power to preserve stored data. Main memory 614 may further include a small portion of non-volatile memory containing software (e.g., firmware, such as BIOS) that is used for reading other software stored in memory device(s) 612 into main memory 614. In some embodiments, the volatile memory of main memory 614 is implemented as random-access memory (RAM), such as dynamic RAM (DRAM), and the non-volatile memory of main memory 614 is implemented as read-only memory (ROM), such as flash memory, erasable programmable read-only memory (EPROM), or electrically erasable programmable read-only memory (EEPROM).

Computer system 600 may include software elements, shown as being currently located within main memory 614, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 616 executable by computer system 600. In one example, such instructions 616 may be received by computer system 600 using communications subsystem 610 (e.g., via a wireless or wired signal carrying instructions 616), carried by communication medium 602 to memory device(s) 612, stored within memory device(s) 612, read into main memory 614, and executed by processor(s) 604 to perform one or more steps of the described methods. In another example, instructions 616 may be received by computer system 600 using input device(s) 606 (e.g., via a reader for removable media), carried by communication medium 602 to memory device(s) 612, stored within memory device(s) 612, read into main memory 614, and executed by processor(s) 604 to perform one or more steps of the described methods.

In some embodiments of the present disclosure, instructions 616 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 600. For example, the non-transitory computer-readable medium may be one of memory device(s) 612, as shown in FIG. 6 with instructions 616 being stored within memory device(s) 612. In some cases, the non-transitory computer-readable medium may be separate from computer system 600. In one example, the non-transitory computer-readable medium may a removable media provided to input device(s) 606, such as those described in reference to input device(s) 606, as shown in FIG. 6 with instructions 616 being provided to input device(s) 606. In another example, the non-transitory computer-readable medium may a component of a remote electronic device, such as a mobile phone, that may wirelessly transmit a data signal carrying instructions 616 to computer system 600 using communications subsystem 616, as shown in FIG. 6 with instructions 616 being provided to communications subsystem 610.

Instructions 616 may take any suitable form to be read and/or executed by computer system 600. For example, instructions 616 may be source code (written in a human-readable programming language such as Java, C, C++, C#, Python, etc.), object code, assembly language, machine code, microcode, executable code, and/or the like. In one example, instructions 616 are provided to computer system 600 in the form of source code, and a compiler is used to translate instructions 616 from source code to machine code, which may then be read into main memory 614 for execution by processor(s) 604. As another example, instructions 616 are provided to computer system 600 in the form of an executable file with machine code that may immediately be read into main memory 614 for execution by processor(s) 604. In various examples, instructions 616 may be provided to computer system 600 in encrypted or unencrypted form, compressed or uncompressed form, as an installation package or an initialization for a broader software deployment, among other possibilities.

In one aspect of the present disclosure, a system (e.g., computer system 600) is provided to perform methods in accordance with various embodiments of the present disclosure. For example, some embodiments may include a system comprising one or more processors (e.g., processor(s) 604) that are communicatively coupled to a non-transitory computer-readable medium (e.g., memory device(s) 612 or main memory 614). The non-transitory computer-readable medium may have instructions (e.g., instructions 616) stored therein that, when executed by the one or more processors, cause the one or more processors to perform the methods described in the various embodiments.

In another aspect of the present disclosure, a computer-program product that includes instructions (e.g., instructions 616) is provided to perform methods in accordance with various embodiments of the present disclosure. The computer-program product may be tangibly embodied in a non-transitory computer-readable medium (e.g., memory device(s) 612 or main memory 614). The instructions may be configured to cause one or more processors (e.g., processor(s) 604) to perform the methods described in the various embodiments.

In another aspect of the present disclosure, a non-transitory computer-readable medium (e.g., memory device(s) 612 or main memory 614) is provided. The non-transitory computer-readable medium may have instructions (e.g., instructions 616) stored therein that, when executed by one or more processors (e.g., processor(s) 604), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a display device, the method comprising:
   generating a request to start a frame, wherein the frame is to be displayed by the display device;
   calculating a target finish time stamp associated with rendering the frame, wherein the target finish time stamp is calculated based on a first amount of time for one or more processors to generate the frame;
   determining a number of VSync periods from a last VSync to a target VSync based on the target finish time stamp to obtain a target VSync time stamp; and
   calculating a predicted head pose time based on the target VSync time stamp and a fixed platform offset, wherein the fixed platform offset relates to a second amount of time for transferring the frame to the display device for display.

2. The method of claim 1, further comprising:
   comparing the target VSync time stamp to the target finish time stamp; and
   based on the comparison, delaying the target VSync time stamp by 1 VSync period.

3. The method of claim 1, further comprising:
   providing the predicted head pose time to a head pose estimator.

4. The method of claim 1, further comprising:
   calculating a head pose based on the predicted head pose time.

5. The method of claim 1, further comprising:
   rendering the frame based on the predicted head pose time.

6. The method of claim 1, further comprising:
   displaying virtual content at the display device based on the predicted head pose time.

7. The method of claim 1, wherein the display device is an augmented reality (AR) device.

8. A system comprising:
a processor; and
a computer-readable medium comprising instructions that, when executed by the processor, cause the processor to perform operations comprising:
generating a request to start a frame, wherein the frame is to be displayed by a display device;
calculating a target finish time stamp associated with rendering the frame, wherein the target finish time stamp is calculated based on a first amount of time for one or more processors to generate the frame;
determining a number of VSync periods from a last VSync to a target VSync based on the target finish time stamp to obtain a target VSync time stamp; and
calculating a predicted head pose time based on the target VSync time stamp and a fixed platform offset, wherein the fixed platform offset relates to a second amount of time for transferring the frame to the display device for display.

9. The system of claim 8, wherein the operations further comprise:
comparing the target VSync time stamp to the target finish time stamp; and
based on the comparison, delaying the target VSync time stamp by 1 VSync period.

10. The system of claim 8, wherein the operations further comprise:
providing the predicted head pose time to a head pose estimator.

11. The system of claim 8, wherein the operations further comprise:
calculating a head pose based on the predicted head pose time.

12. The system of claim 8, wherein the operations further comprise:
rendering the frame based on the predicted head pose time.

13. The system of claim 8, wherein the operations further comprise:
displaying virtual content at the display device based on the predicted head pose time.

14. The system of claim 8, wherein the display device is an augmented reality (AR) device.

15. A non-transitory computer-readable medium comprising instructions that, when executed by a processor, cause the processor to perform operations comprising:
generating a request to start a frame, wherein the frame is to be displayed by a display device;
calculating a target finish time stamp associated with rendering the frame, wherein the target finish time stamp is calculated based on a first amount of time for one or more processors to generate the frame;
determining a number of VSync periods from a last VSync to a target VSync based on the target finish time stamp to obtain a target VSync time stamp; and
calculating a predicted head pose time based on the target VSync time stamp and a fixed platform offset, wherein the fixed platform offset relates to a second amount of time for transferring the frame to the display device for display.

16. The non-transitory computer-readable medium of claim 15, wherein the operations further comprise:
comparing the target VSync time stamp to the target finish time stamp; and
based on the comparison, delaying the target VSync time stamp by 1 VSync period.

17. The non-transitory computer-readable medium of claim 15, wherein the operations further comprise:
providing the predicted head pose time to a head pose estimator.

18. The non-transitory computer-readable medium of claim 15, wherein the operations further comprise:
calculating a head pose based on the predicted head pose time.

19. The non-transitory computer-readable medium of claim 15, wherein the operations further comprise:
rendering the frame based on the predicted head pose time.

20. The non-transitory computer-readable medium of claim 15, wherein the operations further comprise:
displaying virtual content at the display device based on the predicted head pose time.

* * * * *